Figure 1:
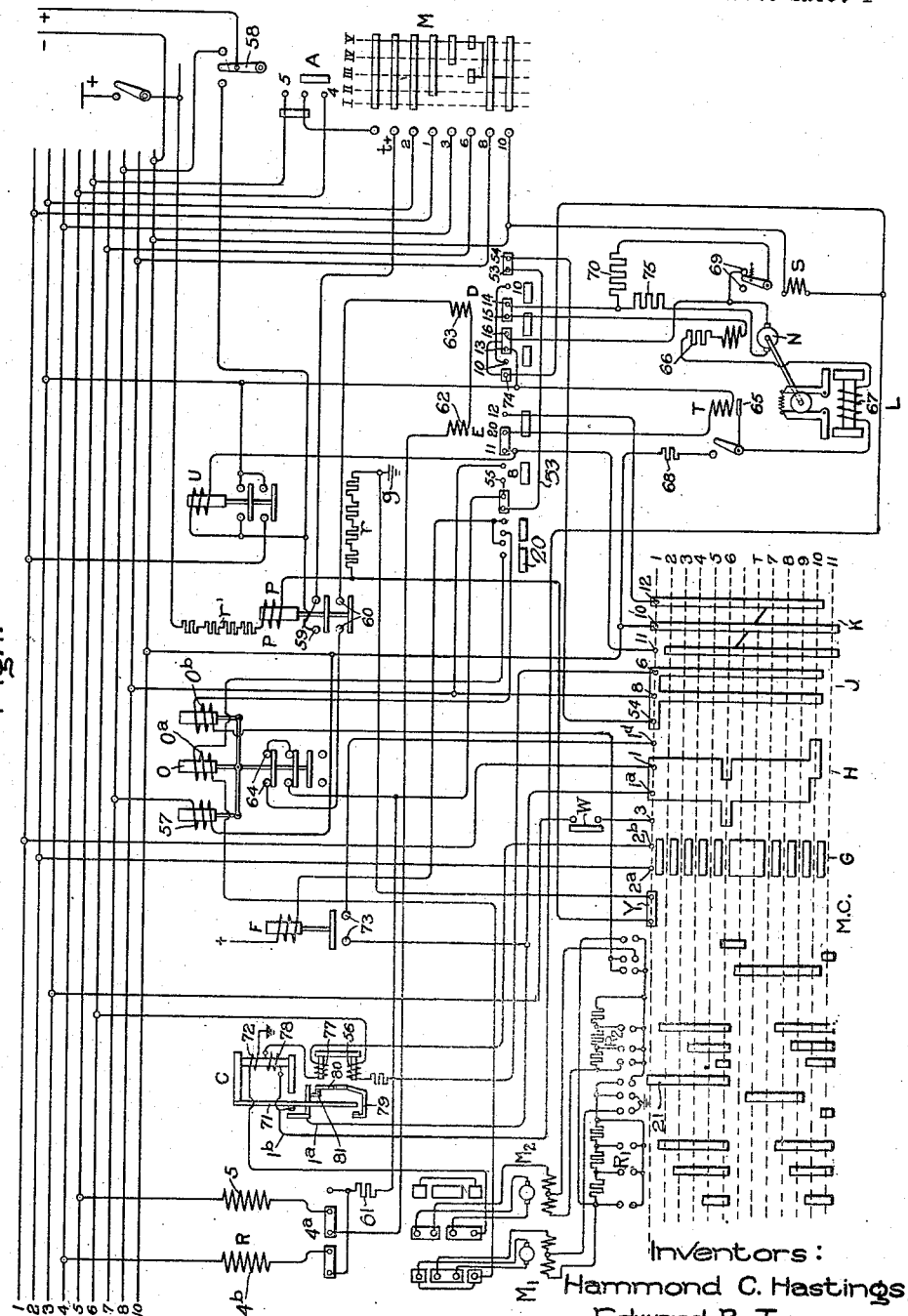

March 9, 1926. 1,576,187
H. C. HASTINGS ET AL
SYSTEM OF ELECTRIC MOTOR CONTROL
Filed Oct. 11, 1924 2 Sheets-Sheet 2

Inventors:
Hammond C. Hastings,
Edward B. Tuppen,
by
Their Attorney.

Patented Mar. 9, 1926.

1,576,187

UNITED STATES PATENT OFFICE.

HAMMOND C. HASTINGS AND EDWARD B. TUPPEN, OF RUGBY, ENGLAND, ASSIGNORS TO GENERAL ELECTRIC COMPANY, A CORPORATION OF NEW YORK.

SYSTEM OF ELECTRIC-MOTOR CONTROL.

Application filed October 11, 1924. Serial No. 743,106.

*To all whom it may concern:*

Be it known that we, HAMMOND C. HASTINGS and EDWARD B. TUPPEN, subjects of the King of Great Britain, residing at Rugby, in the county of Warwick, England, have invented certain new and useful Improvements in and Relating to Systems of Electric-Motor Control, of which the following is a specification.

This invention relates to the control of electric motors and more particularly to systems wherein the motors are automatically accelerated at a speed determined by the current taken by the motors. In systems of this type it is sometimes advisable to advance the motor controller even though the current on any definite step in the progression has not dropped to the predetermined value, in which case a notching relay of the kind described in the patent to John F. Tritle, No. 1,412,636, dated April 11, 1922, could be employed to advantage. A separate manually-operated switch is usually adapted to by-pass the relay and allow an accelerating notch to be taken independently, so that if the motor current has not dropped to a value corresponding to the setting of the relay an accelerating notch can still be taken.

The by-pass scheme is usually employed only where the motors are used to drive a car or locomotive up a gradient and as the driver requires one hand for operating the driver's valve and the other for the handle of the master controller, the manipulation of the separate manually-operated switch presents difficulties.

According to the present invention the means for non-automatic acceleration of the motors are combined with the means for automatic acceleration under current limit control in such a manner that either condition may be obtained at will by the operation of a single handle on the master controller. The moving contacts for obtaining non-automatic acceleration are preferably incorporated on the main contact drum and co-act with corresponding fixed contacts for controlling a by-pass coil on a notching relay.

The master controller may be so arranged that if, during automatic progression with the said controller in a definite position, the main current does not fall to the predetermined value, then a movement of the controller to a second position will allow one notch to be taken. The movement of the controller back to its original position will allow automatic progression to occur if the current has decreased below the predetermined value, but if the current is still above the said predetermined value then a movement of the master controller to the second position will take another notch.

Figure 2:
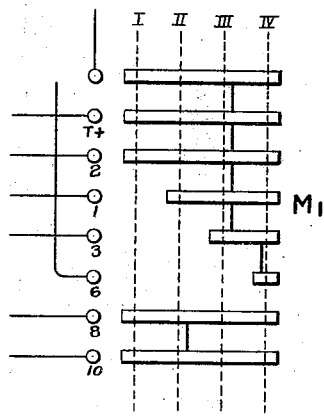
Figure 3:
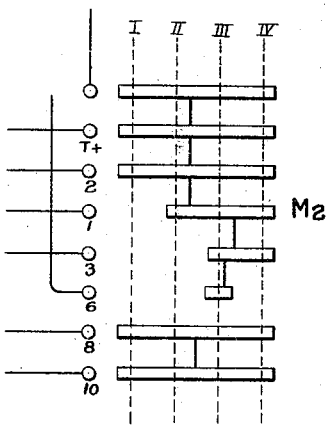
Figure 4:
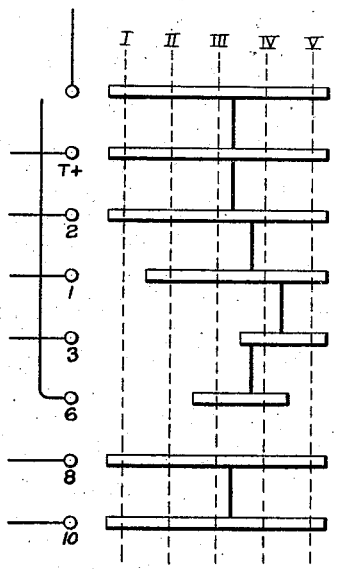

One method of carrying the invention into effect is illustrated in the accompanying drawings, in which Fig. 1 is a diagrammatic arrangement of a control system embodying the invention, and Figs. 2 and 3 show modified forms of master controller; and in the accompanying drawing, in which Fig. 4 shows a further modified form of master controller.

Referring to Fig. 1 a master controller M comprises contacts for by-passing a notching relay C and contacts for energizing the train wires and a pilot motor N. The relay C comprises a main current coil and a lifting coil, a holding coil and a by-pass coil and is preferably of the type described in the said patent to Tritle No. 1,412,636. Two line breakers D, E, are each adapted to operate a set of interlocking contacts as shown. The relay F has a main current winding and contacts for controlling the movement of the main controller MC in conjunction with the relay C to ensure that the tapped field connection of the main motors M¹, M², cannot be made until the main motor current has decreased to a predetermined value. It will be observed that the main controller is provided with suitable contact segments which are arranged in a well known manner for controlling the interconnection of the motors M¹, M², for series and parallel operation, as well as for controlling the speed regulating resistors R¹, R². A series of contacts G on the main controller are adapted for use with the relay C and ensure that once movement of the main controller has commenced it will continue until the next notch is reached, independently of the fact that the accelerating relay contacts may be open due to high current in the main motor circuit. A contact segment H, also on the main control cylinder, is used in conjunction with the master controller M and relays C and F, and has a gap opposite finger 1 which corresponds to the end of the series notches and wire 3 must be energized from the master controller before the main controller will advance to the parallel positions. Also finger 1 must be energized by the relay F before the main controller will advance to the tapped field position.

The contact segment J is used in conjunction with interlocking contacts on line breaker D to prevent the line breakers D and E being closed unless the main controller is in the off position. A contact segment K, also on the main controller, is used in conjunction with the interlocking contacts on line breaker E and the relay U to provide means for energizing the pilot motor N in order that the main controller shall be returned to the off-position when the master controller is in the off-position. The mechanical friction brake L is adapted to bring the pilot motor to rest in the full-on position and also when returning to the off position, as under these conditions the pilot motor circuit is opened and it therefore cannot be stopped dynamically. The pilot motor N for operating the main controller is connected to the brake L and may be provided with a shunting resistance 70 in parallel with the armature or a resistance 75 in series with the armature, or both may be employed. O represents an overload relay having two main windings $O^a$ and $O^b$ connected in the main motor circuits. It has a coil 57 for setting the relay after it has been tripped by an overload, and is set by closing the control switch 58 to the right, thus energizing wire 7.

The undervoltage relay P is provided as is customary, and the reverser R is provided with the usual interlocking contacts to prevent it being thrown except when the line breakers D and E are in the open position. A braking relay S is biased so that its contacts are closed when the coil is deenergized. The relay T is provided for energizing the pilot motor according to the relative position of the interlocks on the line breakers D, E, and contacts K, and the contacts of relay U. The relay U is arranged to energize the pilot motor and cause it to return the main controller to the off-position when the master controller M is in the off position. The interlock W may be arranged to be opened when either motor or pair of motors is cut out by a suitable cutout switch, not shown, in order to prevent finger 3 being energized and thus prevent the main controller on any particular coach where a motor or motors are cut out, from advancing to the parallel positions. A contact Y on the main controller prevents the potential relay P closing unless the main controller is in the off position. It will be seen that the off-position of the main controller also corresponds to the first position, depending upon the position of the master controller by which the line breakers are controlled.

In operation, assuming that no circuits are energized except the main collecting shoes, the main switch (not shown) is closed and the potential relay P energized, the current passing from the positive shoe through the resistance $r^1$, the coil to $p$ and through the contact Y to earth. The relay P would not have closed if the control cylinder had not been in the off-position, as the resistance $r$ shown would not allow sufficient current to pass. The switch 58 is now moved to the right-hand contact, energizing wire 7 and thus setting the overload relay O through coil 57 to wire 10. Switch 58 is now closed to the left-hand contact, thus energizing through contacts 59 the terminal $t+$ on the master controller M. The reversing controller A is then moved to the forward or reverse position as required. Assuming that it is moved to energize wire 4, coil $4^b$, on the reverser R is energized through resistance 61 and contacts 55—53—54—8, but no current will flow as wires 8, 10 have not yet been connected. It will be seen that the circuit just described can only be completed when the interlocks on line breakers D and E are in the position shown, which corresponds to the open position of the line breakers.

The master controller M is now moved to the first position. This energizes the reverser circuit just described and the reverser R is thrown to connect the armature and field windings of the motors $M^1$, $M^2$, for operation in the desired direction, and at the same time move the reverser interlock contacts $4^a$ to the right. The current will now pass from wire 4 to coil $4^b$, on the reverser to $4^a$, through the line breaker coils 62, 63, interlock 60—64—55—53—54—8 and from 8 to 10 through the master switch M. Line breakers E and D now close, the circuit then being from wire 4, coil 4—$4^a$—62—63—60—64—55—8—10. Wire 2 is also energized through the master controller M, current passing to 65—20—12—10, thus closing the relay T and allowing current to pass from 2—13—10—14 through the pilot motor armature 16—15, pilot motor field resistance 66, brake magnet winding 67, contacts of relay T, resistance 68—10. The connections for operating the pilot motor are therefore complete and the motor is energized but will not run as the armature is short-circuited by the contacts 69 of the relay S through the resistance 70, the relay S being spring biased to the closed position. The closing of the line breakers completes the power circuit of the main motors, $M^1$, $M^2$, from the positive shoe + through F—contact 20 of the line breaker—coil $O^a$—motor $M^1$—$R^1$—contact segment 21 of the main controller—$R^2$—$M^2$, and relay winding 72 to ground, this being the first series running position with all resistance in circuit.

The main controller will not advance to the second position to cut out a section of the resistances $R^1$, $R^2$, until the master controller M is moved to the second position, in which wire 1 is energized. This allows current to pass from 1—$1^a$ to the armature 71 of notching relay C thence through $1^b$—relay S to wire 10. If, however, the main current is too high in the coil 72 to allow the armature 71 to make contact at $1^a$, relay S will not be energized and the pilot motor will not run. When the main current decreases to a predetermined amount, contact is made at $1^a$ and current passes to $1^b$, relay S to 10. This will open contacts 69, allowing the pilot motor to advance the main controller towards the second notch. When the first segment of contacts G connect contacts $2^a$ and $2^b$, current will then flow from 2—$2^a$—$2^b$, coils 77 and 78 to $1^b$ and in this way the circuit through relay S will be maintained regardless of the value of the main current in the coil 72, so that the main controller will advance until $2^a$—$2^b$ are disconnected.

The cutting out of the first section of resistances $R^1$, $R^2$, will again increase the main current holding the armature 71 away from contact $1^a$, so that the pilot motor will be again stopped by the closing of contacts 69 until such a time as the armature 71 is released, when the same sequence of operations will take place and the main controller be advanced to the third position. It will be observed that throughout this sequence of operations the pilot motor is continuously energized, and consequently the brake L does not come into operation. The main controller will therefore advance under the control of relay C until the sixth notch is reached, when contact 1 comes opposite a gap in segment H. In this position the motors are connected across the line without any series resistance.

It has been assumed in the operation of cutting out the series resistance that the accelerating current always decreases to a value below that for which the notching relay C is set to release. If, however, the current does not drop a movement of the master controller handle to the third position energizes the wire 6 and the by-pass coil 56 on the notching relay C. The armature 79 will thereby be moved to make engagement with the end of the armature 71 and the contact $1^a$ will be short circuited through a circuit including the armature 71, the hook on the armature 79, the armature 79, the armature 80 and contacts 81. The relay S is therefore energized and the pilot motor will advance one notch and thereupon be arrested from further movement since the coils 77 and 78 which are in series will be energized at contacts $2^a$, $2^b$, and the contacts 81 will be thereby opened, thus deenergizing the relay S. A movement of the master controller back again to the second position will allow automatic acceleration to occur, or if the current will still not decrease to the calibrated value of the notching relay C a movement of the master controller to the third position will take another notch.

A movement of the master controller to the fourth position will energize wire 3 and this again allows current to pass to $1^a$ on relay C, when the sequence of operation for the series points will be repeated until the main controller reaches the tenth notch corresponding to the two main motors being connected in parallel with all resistance cut out and with full field. If the current does not drop to its predetermined value when the main controller is being rotated to the full parallel position, the pilot motor can be advanced one notch by moving the master controller to the fifth position.

This arrangement allows the driver to control each notch in a very convenient manner, as he can move the master controller handle from the first position to the third position without dwelling on the second position, and he will then take only one notch. To obtain each successive notch he must move the handle back to the second position and then on again to the third. Similarly he can control each of the parallel notches by moving the controller handle between the fourth and fifth positions. The arrangement thus enables the driver to control each notch quite as readily as in a non-automatic control scheme where each point of the master controller corresponds to a step of the control equipment.

Fig. 2 shows a modified master controller $M^1$, which may be substituted for the controller M, Fig. 1, without requiring any alterations in the arrangement or connections of the control system. In place of the five positions shown on the controller M, the controller $M^1$ has only four positions. The first and second positions of controller $M^1$ corresponds with the first and second positions respectively of the controller M. The third position of controller $M^1$ corresponds with the fourth position of controller M, whilst the fourth position of controller $M^1$ energizes train wire 6 and brings the bypass feature into operation. Thus only one position of the controller $M^1$ gives the by-pass feature and therefore a master controller of more simple construction is provided. A further advantage of using controller $M^1$ is that in moving from the off-position to either the second or the third position the contact segment opposite finger 6 is not passed over and therefore the possibility of advancing the main controller one notch prematurely as might be the case with the controller M when moving from the off-position to the fourth position is avoided. A spring may be introduced between the third and fourth positions, arranged to bias the controller handle towards the off-position, but only from the fourth to the third position. This spring materially assists the operator as the fourth or by-pass position is not reached without a certain amount of additional force being applied to the handle. Thus the operator can move the handle to the third position, which is the normal full-on position, without the risk of taking a by-pass step accidentally. Another advantage of employing the spring is that the operator is less likely to hold the controller in the fourth position and therefore the by-pass coil which is usually not continuously rated, is not so liable to be left in circuit for an undue length of time.

Another modified master controller M² is shown in Fig. 3, which is similar to Fig. 2 with the exception that the segment of finger 6 provides the by-pass connection on the third position instead of on the fourth position. In this case the normal full-on position of the master controller is the fourth position and therefore to operate the by-pass from the fourth position the operating lever is returned to the third position and to operate the by-pass from the second or series position the operating lever is advanced from the second position to the third position.

A further modified master controller M³ is shown in Fig. 4, which differs from Fig. 3 in that the by-pass contact, which is opposite finger 6, reaches over two divisions and necessitates five points on the master controller instead of four. The arrangement shown in Fig. 4 has the advantage over that shown in Fig. 3, in that with Fig. 3 it is difficult for the operator when notching up by means of the by-pass to tell when the full series position has been reached because in getting the by-pass connection the parallel contact 3 is also made, whereas in Fig. 4 the notching between the second and third point will give full series and the parallel points will not be reached until the fifth stop on the controller.

What we claim as new and desire to secure by Letters Patent of the United States, is:—

1. In combination, a main controller arranged to be advanced step by step for starting electric motors, a current limit device for causing the step by step advance of the main controller to be normally under the control of the motor current, a multi-position manually operated master controller for cooperating with said current limit device to determine at will the limit to which said main controller is automatically advanced under the control of said device, and means whereby the said controller is caused to advance step by step independently of the motor current by operating the said master controller between positions of the same.

2. In combination, a main controller arranged to be advanced step by step for starting electric motors a current limit device for causing the step by step advance of the main controller to be normally under the control of the motor current, a multi-position manually operated master controller for cooperating with said current limit device to determine at will the limit to which said main controller is automatically advanced under the control of said device, and means whereby said main controller is caused to advance step by step independently of the motor current by advancing the said master controller to a definite position and returning the master controller to a preceding position.

3. In combination, a main controller arranged to be advanced step by step for starting electric motors, a current limit device for causing the step by step advance of the main controller to be normally under the control of the motor current, a multi-position manually operated master controller for cooperating with said current limit device to determine at will the limit to which said main controller is automatically advanced under the control of said device, means whereby the said current limit device is rendered temporarily ineffective by advancing the said master controller to a position in advance of the position to which it is desired that the main controller shall advance, and connections whereby the master controller must then be returned to a position corresponding to the position to which the main controller has advanced before the main controller can advance to a further position under the control of the master controller.

4. In combination, a main controller for starting electric motors, a current limit device for causing the step by step advance of the main controller to be normally under the control of the motor current, a multi-position manually operated master controller for cooperating with said current limit device to determine at will the limit to which said main controller is automatically advanced, under the control of said device, means under the control of said controller for permitting said main controller to advance a step independently of the motor current, and connections whereby the said main controller is prevented from taking a further advance step until after the said master controller has been returned to a preceding position.

In witness whereof, we have hereunto set our hands this 22nd day of September 1924.

HAMMOND C. HASTINGS.
EDWARD B. TUPPEN.